INVENTOR.
SAMUEL J. JAMISON
BY
ATTORNEY

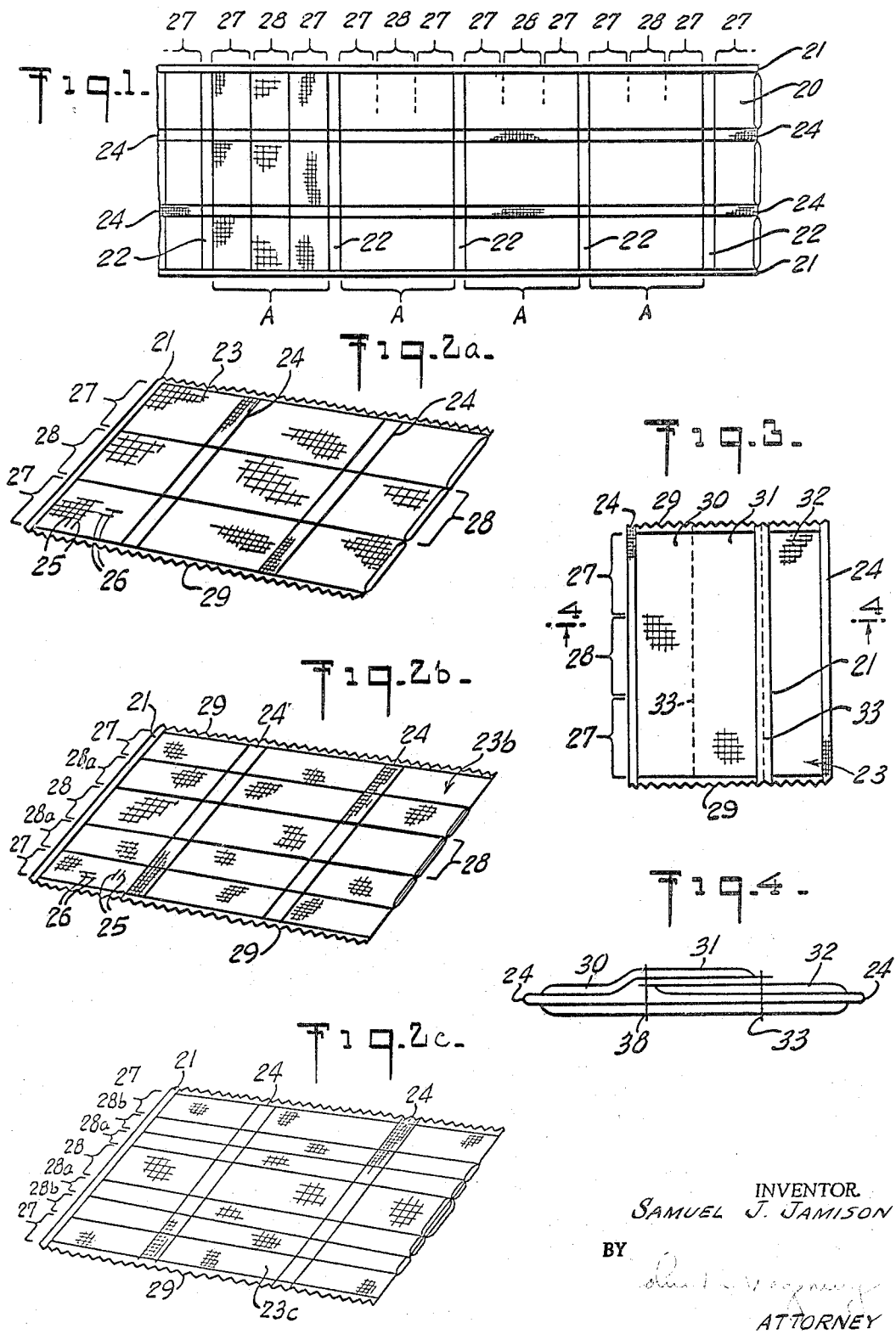

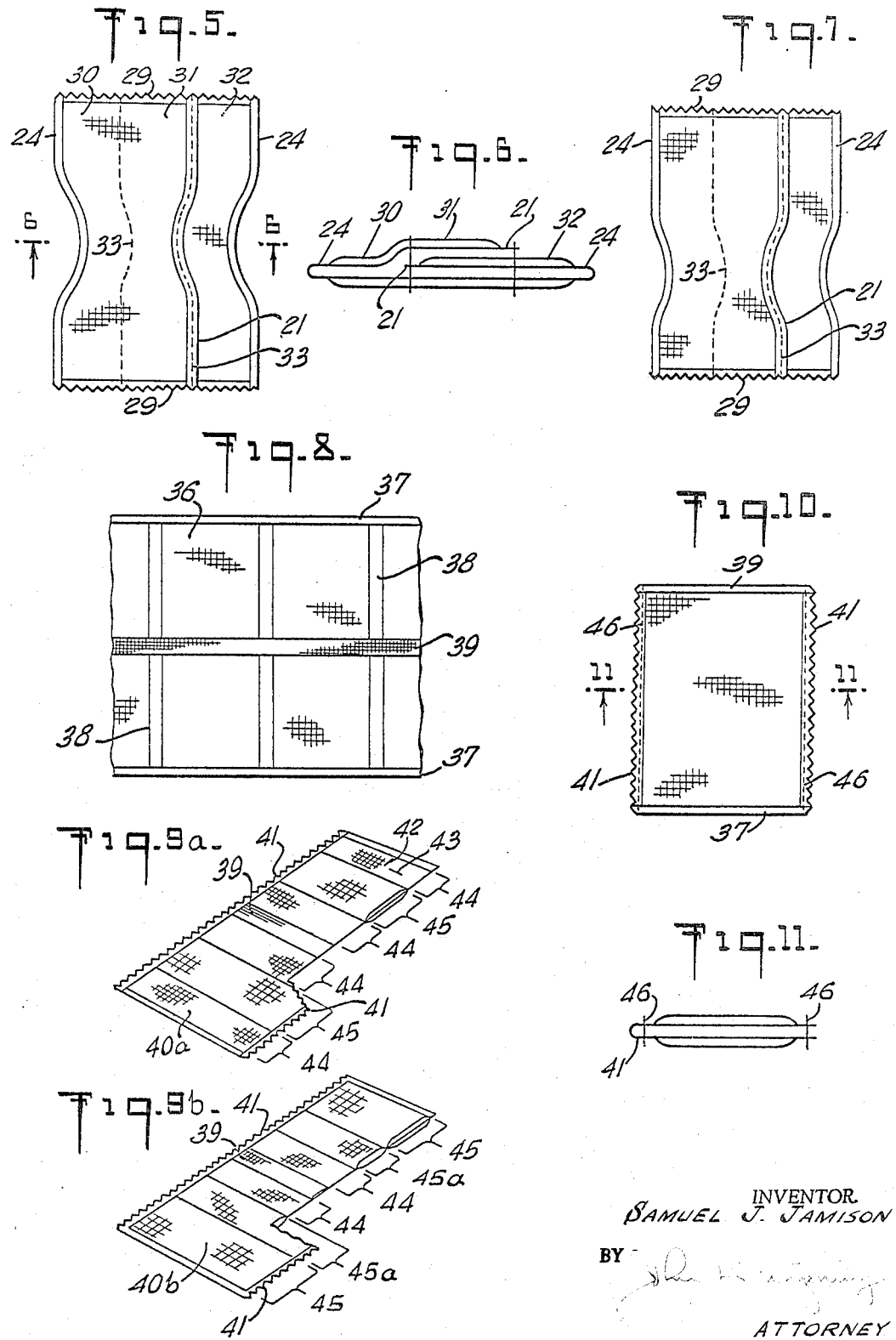

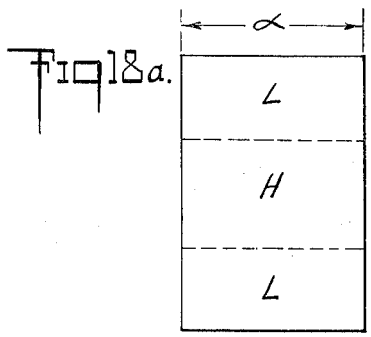
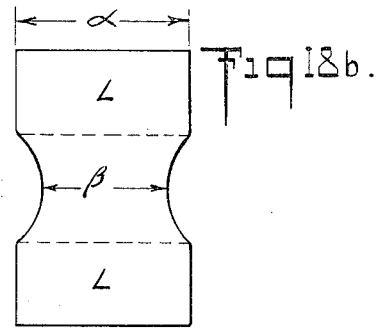
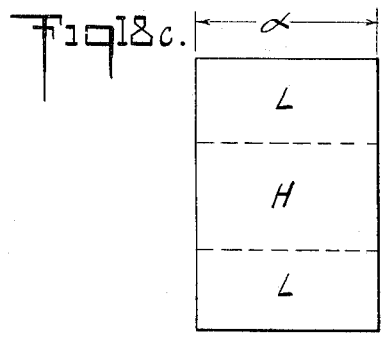
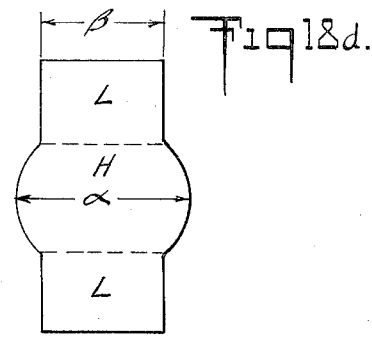
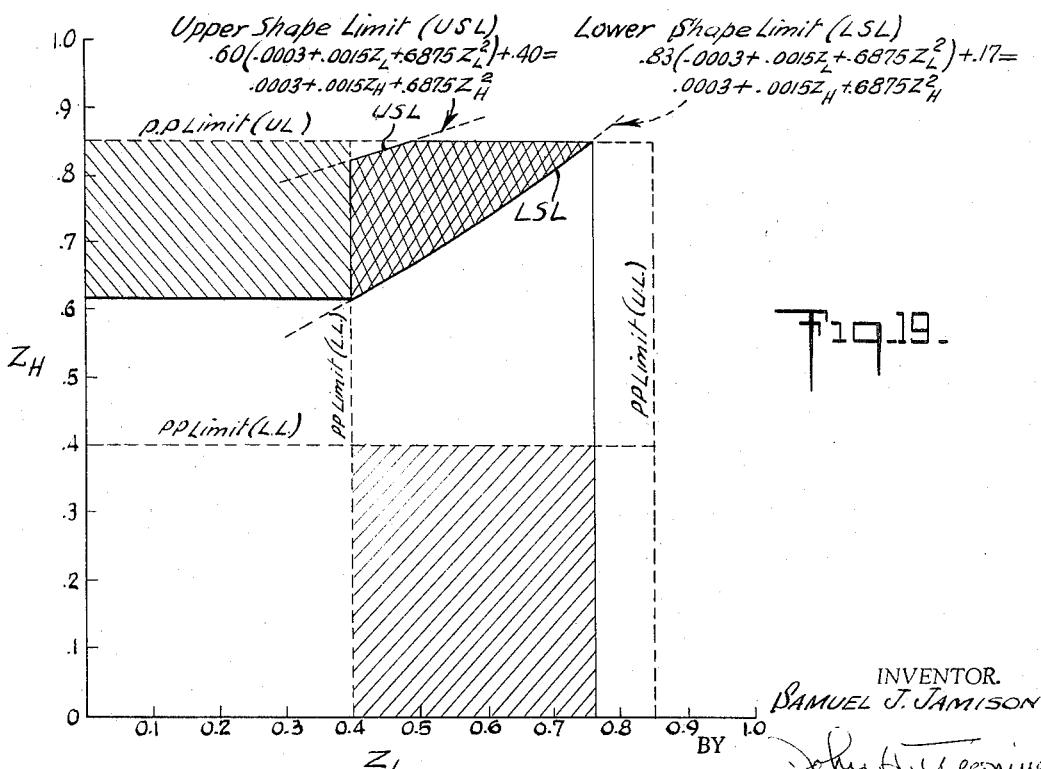

United States Patent Office 3,291,162
Patented Dec. 13, 1966

3,291,162
DIAPER
Samuel James Jamison, East Brunswick, N.J., assignor to Johnson & Johnson, a corporation of New Jersey
Filed Oct. 23, 1965, Ser. No. 503,219
8 Claims. (Cl. 139—383)

This application is a continuation-in-part of my copending application Serial No. 414,980, filed December 1, 1964 and my copending application Serial No. 360,628, filed April 17, 1964, which was a continuation-in-part of application Serial No. 288,067, filed May 14, 1963, now abandoned, which was in turn a continuation-in-part of application Serial No. 132,935, filed August 21, 1961, now abandoned.

The present invention relates to a woven textile fabric having zones of different shrink characteristics. More particularly, it relates to a woven diaper having different shrink characteristics in zones so disposed as to cause the diaper to become form-fitting when the shrink characteristics are developed.

For many years the diaper industry has been providing form-fitting diapers by cutting out portions of the diaper blank or otherwise constructing a diaper such that areas conforming generally to the contour of babies' legs will be provided. This has proved not only to be a costly operation since the additional steps of cutting out the material from the blank and sewing the edges of the cutout area to the blank has been necessitated, but it added discomfort factors to such diapers.

Now, in accordance with the present invention there is provided a diaper constructed of interwoven warp and filling yarn set wherein at least from about 50% to about 100% of one first set of said yarn possesses a high twist multiplier of from about 5 to about 8, said blank having at least one activating zone adapted to shrink on activation to provide a contoured diaper and said first set of yarn defining the direction of activation in said diaper.

The term "activating zone" as used herein is generally defined as the zone, or zones, of the diaper which exhibits greater shrinkage, unidirectionally, than the remainder of the diaper. The degree of greater shrinkage will be defined mathematically. More specifically, the "activating zone" (or zones) is defined by a more open construction than the remainder of the diaper.

Preferably, the instant invention provides a diaper of zoned construction wherein at least one of said zones is an activating zone, said diaper being defined by the cross hatched area in FIG. 19 having shape limitations defined by the upper shape limit (USL) and the lower shape limit (LSL) and having physical property limitations defined by a $Z_L$ of at least about 0.4 and a $Z_H$ of up to about 0.85, said diaper being adapted to form a predesigned parameter upon activation.

The invention provides a diaper constructed from a diaper blank. This is meant to include both the instance where the blank serves unfolded as the diaper, and the instance where the diaper is folded in one of many possible patterns, to serve as the diaper.

The term "single-ply" as used herein is meant to define not only a cloth construction wherein fill and warp yarns are interwoven in the same one plane, but also, a cloth construction having two planes, each of interwoven fill and warp yarns, where the warp or fill yarns of either one or both of said two planes interlace the yarns of the other of said two planes, either in a regular or an irregular pattern, over the entire cloth.

By the term "construction" as used herein is meant the picks and ends per inch, the yarn size, the weave design and the ply difference in the diaper fabric. The term can apply equally as well to each, or all of these factors; however, unless it is specifically recited to the contrary, it shall be meant to include all four of these factors.

The diaper fabric of this invention, and the diaper blank taken from the diaper fabric, are constructed of yarn of two sets, i.e., the warp set and the filling set. It is essential to the instant invention that at least one of these sets contain from about 50% to about 100% of yarn possessing a high twist multiplier of from about 5 to about 8, and that the yarn of this particular set extend in the diaper in a direction parallel to the direction of the programed or predesigned unidirectional shrinkage to be developed in the activating zone or zones of the diaper upon activation of these zones. While the diaper blank may be constructed such that 100% of the warp or filling yarns are high twist, i.e., have a twist multiplier between 5 and 8, it is essential, as stated, that one set extending in the direction of preplanned unidirectional shrinkage have from 50% to 100% high twist yarns distributed substantially uniformly in the fabric, since this provides the energy factor which acts with the other features of this invention to provide the unidirectional shrinkage that creates the contoured diaper. The yarn of the diaper which is not high twist yarn shall have a twist multiplier of less than 5 but, in such case, the filling yarn will have a twist multiplier of 3.2 and above and the warp yarn a twist multiplier of 3.5 and above and preferably such other-than-high twist filling yarn shall have a twist multiplier within the range of from about 3.5 to about 4.0 while such other-than-high twist warp yarn shall preferably have a twist multiplier within the range from about 3.8 to about 4.3.

A twist multiplier of below 3.2 in the filling yarns results in a diaper which has insufficient wear strength and also exhibits marked undesirable pilling while a twist multiplier of less than 3.5 in the warp insures the same two unsatisfactory results in the finished diaper. Additionally, twist multipliers of less than these will provide yarn of insufficient strength to withstand modern-day mechanical weaving procedures.

Twist multipliers of 4.0 in the fill and 4.3 in the warp of these other-than-high twist yarns are impractical because of the economics involved.

It is preferred that only one set of the yarn in the blank will contain a high twist yarn since corrugation is sometimes encountered if both sets of yarn are substantially of high twist yarn. Preferably from about 75% to about 100% of one set of yarn in the blank possesses a high twist. These high twist yarns are substantially uniformly dispersed throughout the one direction of the diaper to preclude uneven shrinkage which would result if areas devoid of high twist yarn were established.

The activating zone of the diaper blank is the zone extending from one of two opposite edges of the diaper blank to the other and there may be one or two, or more, of these activating zones in the blank. When there is but one activating zone in a diaper blank it will occupy from about 25% to about 50% of the total area of the diaper blank; however, when there are two or more separate activating zones, they will each, in the general case, occupy substantially equivalent areas and will both occupy a combined area of from about 65% to about 80% of the total area of the diaper blank.

Diaper fabric is usually low count woven fabric, termed gauze diaper fabric, having a woven construction of warp and fill yarns wherein the warp yarns extend substantially parallel to the length of the fabric and the fill yarns extend in the widthwise direction of the fabric which is more usually produced in continuous lengths of specified widths woven in such a manner as to be joined along the longitudinal edges in common selvages. This fabric may be single-ply or multi-ply.

From this diaper fabric, diaper blanks are taken or cut. These blanks are usually rectangular in shape, yet it is possible that other than rectangular blanks could be taken. Thus the diaper blank is usually rectangular and has two longitudinal and two lateral edges or sides. The diaper blank, of course, is of the same basic woven construction as the diaper fabric and contains warp and fill yarns. The warp and fill yarns, and the warp and fill direction of the diaper blank, are herein defined with reference to the diaper fabric; therefore, the warp yarns or warp direction of the diaper blank need not be the length of the blank but will always define the lengthwise direction of the original diaper fabric, while in the blank it may, depending on how the blank was taken from the diaper fabric, be either the lengthwise or widthwise direction of the diaper blank. The size of the blank may vary from about the normal 40 x 20 inch size to smaller or larger sizes depending on the desired form and whether or not the blank was meant to be folded or not. The fabric may have a plain, twill, sateen, satin, bird's-eye, etc., weave, all of which are familiar to those skilled in the art.

Because of techniques of spinning, weaving and finishing used in the manufacture of cotton fabrics, the fabric as a whole is usually under tension; therefore, it must be appreciated that it will be stretched to a greater or lesser extent. Washing, or laundering of the fabric, will quite naturally relieve the tension and with the internal tension relieved the fabric will, on drying, change in dimension since the individual yarns will assume positions closer to the adjacent yarn member of the fabric throughout, and the interstices between yarn will be lessened appreciably. Thus, the original unit area of the fabric is diminished to a degree which is dependent upon the amount of energy imparted to the yarn of the fabric as well as upon the spacing of the interstices between the individual yarn, since with little or no spacing between the yarn, the movement of the yarn within the fabric, i.e., the movement in the plane of the fabric, is limited if not precluded. Of course, a tight construction plus sufficient energy in the yarn will cause the yarn to protrude in random fashion from the fabric after washing and drying, since movement in the plane of the fabric is not possible because of the very limited, or complete lack of, spacing between the yarn. This provides sites which receive the full brunt of the forces of wear and are thus the areas which wear out very quickly and shorten the life of the fabric. Thus it can be seen that in the construction of the fabric, i.e., the picks and ends per unit area, the number of plies, the yarn size and the weave of the diaper are of major importance in considering shrinkage since any one or any combination of these features will effect the spacing between adjacent picks or ends in the plane of the fabric.

All gauze diaper fabric will shrink unless mechanical or chemical means are provided to lessen it. The instant invention provides much greater unidirectional shrinking potential in the activating zone or zones whereby a preconceived form or contour change is effected after shrinking is developed. This is accomplished by providing an activating zone(s) which is characterized by an open construction; however, as the open construction of the activating zone is essential, so is it essential that from 50% to 100% of the yarn of at least the set of yarn extending in the direction of the programed unidirectional shrinkage possess a high twist multiplier. This latter requirement is essential since it provides the energy factor in the yarn which is activated by washing and drying and which responds to effect the desired shape or contour in the diaper blank, when there is sufficient space between the individual yarns in a single layer or ply, or in several layers or plies, to produce the desired shrinkage differential between the activating zone and the remainder of the diaper. Thus, the high twist yarn extending in the direction of the desired greater unidirectional shrinkage provides the potential energy to provide this particular increased shrinking; however, the amount of shrinkage which will be developed, or will be allowed to develop, is controlled by the openness or looseness of the construction of the activating zone as compared to the construction of the remainder of the diaper blank. Since the high twist yarn runs throughout the diaper and is not restricted to a particular zone in the diaper, it is understood that high twist yarn by itself does not effect the contoured diaper of this invention.

It is also essential that the twist multiplier of the high twist yarns in the diaper blank of this invention be of from about 5 to about 8, with 6 to 7 being preferred, since yarn having a twist multiplier below 5 will not effect the desired shrinking within this invention because there is insufficient potential energy contained in such yarns. Yarns having a twist multiplier above 8 become economically impractical and tend to become abrasive.

The activating zone of the instant invention has been defined as one having more shrinkage, unidirectionally, resulting from a more open or looser construction than the remainder of the diaper. Such an open construction is produced by any one or any combination of the following four changes (in the activating zone) in construction variables: reducing the number of picks per inch, reducing the number of ends per inch, utilizing a yarn of sufficiently lesser diameter than that of the rest of the diaper and increasing the weave floats. Any one of these four changes will open the fabric of the activating zone by providing increased spacing between adjacent fill or warp yarns, or both, as compared to the rest, or the nonactivating zone or zones of the diaper; however, if any one of the above changes in construction variables is reversed, this will cause the construction to become tighter. Then, and in that event, this cause of tightness, i.e., closer spacing of adjacent parallel yarns, may be off-set by utilizing one of the variables above. For example, if it is desirable to increase the number of picks in the activating zone in order to obtain greater absorbency, overcome roughness of the fabric, improve wear or decrease the tendency toward corrugation, or any of these in that zone, since in some instances a contemplated reduction in picks in the activating zone would provide some or all of these disadvantages, the necessary open construction essential to the activating zone may be effected by simply decreasing the ends per inch in the activating zone as compared to the rest or the nonactivating area or zones of the diaper.

Certain manufacturing techniques are available to effect the aforegiven four variables in the activating zone. The ply or plies of the fabric may be increased in that zone thus reducing the ends or picks, or both, per ply. A number of warp ends or filling picks in that zone may be removed from the fabric. The reed may be expanded to reduce the ends per inch in that zone and thus expand the unit area of the fabric in that area. Lesser diameter yarns may, in that zone, replace the larger diameter yarns of the rest of the diaper. The picks per inch may be reduced in that zone. Finally, the weave may be changed in that zone by increasing the floats.

The fabric of this invention is that which is considered and known by the art as gauze diaper fabric. Thus, within this definition and considering the then appropriate yarn sizes, the fabric will only be so open as is acceptable for diaper fabric measured in terms of acceptable absorbency, strength, softness or lack of roughness, corrugation and abrasion resistance. Thus in the normal case, there must be at least 20 warp ends per inch in the face plies of the activating zone and at least 12 picks per inch in these same face plies. In the customary case these rules apply only to the face plies if more than a single-ply activating zone is present, since the face plies are the body contacting members of the diaper where corrugation and the lack of abrasion resistance present undesired features.

The diaper blanks of the instant invention may normally range in width from 28 to 40 inches and normally from 15 to 40 inches in length. A two-layered diaper fabric usually has a thread count in each layer ranging from 32 to 48 ends per inch and from about 28 to 45 picks per inch, while in the normal case a single-ply diaper customarily has a thread count ranging from 48 to about 90 ends per inch and from 24 to about 80 picks per inch. The yarn sizes in any instance with regard to the diaper blank of the instant invention will range from 10's to 40's and this range would apply equally as well to both the warp and fill direction. The weight range of the diaper blanks of the instant invention would run from 42 to 125 grams.

The twist multiplier for a yarn is determined by dividing the number of turns per inch by the square root of the yarn size. In prior art woven diapers, the individual yarns in the warp set and in the fill set respectively, have substantially the same number of turns per inch with the twist multiplier for the warp yarns generally not in excess of 4.75 and the twist multiplier for the filling yarns generally not in excess of about 3.75. This twist multiplier limitation applied with regard to one-inch cotton, however, it would vary only to a minor amount if at all with other cellulosic fibers, e.g., rayon, and would also increase as the yarn became finer or decrease as the yarn became coarser. Thus the degree of shrink could be modified by the use of coarser or finer yarns in part or in toto. In such a case the twist multiplier could remain constant or could be changed if desired which would nullify, reduce or increase the effect of the use of finer or coarser yarn depending on what was accomplished with regard to the twist multiplier.

The twist in the normal or standard yarn may be placed in either the right-hand direction (Z-twist), the left-hand direction (S-twist), or it may be that the yarn may have a combination of S and Z twist yarns in a set. When the high twist yarns are the fill yarns, the twist may be S or Z, or S and Z randomized or alternating. If the warp yarns are the high twist yarns, the direction of twist would normally have to be other than a combination of S and Z, since with this combination undesired corrugation results; however, where a long float weave is employed in the activating zone of the instant invention, a combination of S and Z twist may be used since the problem of corrugation is lessened.

If the filling set of yarn contains all of the high twist yarn, it is preferred that these filling yarns all have the same direction of twist.

In contemplating a shaped diaper, the two shapes that presently appear to be the most desirable are appropriately called the hourglass and the trapezoid (see FIGURES 5 and 16 respectively). This does not exclude other configurations but merely indicates the two most desirable forms. It will be appreciated that prefolded diapers as well as diapers which are to be folded into the reversible type and those that are not designed to be folded or are simply not provided in other than rectangular form, are included in the invention disclosed hereby.

By the "reversible type" is meant a diaper which is folded, usually once, to superimpose two or more like panels, which in this instance would be activating zones, and secured in position. After some wear is effected, the stitching may be broken and the diaper fold reversed to put the two faces which were contiguous to one another in the interior of the diaper, in position so that each defines the outside or outer faces of the diaper. New surfaces are thereby provided and the worn surfaces occupy the interior of the diaper blank.

The amount and type of shrinkage evidenced in the diaper may be influenced by the provision of a pair of intermediate zones, one on either side of, and each of these paralleling, the activating zone. These intermediate zones must shrink on activation but to a noticeably lesser degree than does the activating zone itself. Thus, there must be a difference, in a shrinking sense, between the intermediate zone(s) and both the activating zone(s) and the remainder of the diaper blank. This is accomplished by providing a less open construction in the intermediate zones, e.g., more picks or ends per inch, by using yarn of a different size or a different weave, than is in evidence in the activating zone. In the instance where both the activating zone and the remainder of the diaper are of the same construction, the intermediate zones are simply defined by a construction that is not so open or loose as the construction of the activating zone and more open than the rest of the blank, if the blank has additional zones.

It is apparent that each of the intermediate zones is designed to occupy but a small area of the total area of the diaper; however, it is equally apparent that the size of these zones can vary somewhat but will never equal the area of the activating zone proper. Of course, there are certain instances where but a single intermediate zone is needed adjacent to one activating zone. Such instances are easily provided for as can be seen in FIGURE 12b. Other combinations of the above-given requirements are readily apparent.

The preconceived diaper configuration with which this invention is concerned, is designed, in the usual case, to provide reduced width in the area of the crotch while maintaining sufficient diaper width in the area of the diaper blank to insure that the diaper will cover the area of the buttocks and that it will be of sufficient width to permit it to fit around the girth of the infant and thus be pinned or otherwise secured at its corners or ends. In a special instance, i.e., for infant use, the elasticity provided by the activating zones of this invention will permit a diaper of the configuration of that of FIGURE 18d. By this invention not only are form-fitting features provided but improved bulk and increased or improved absorbency in the crotch area, measured in terms of unit area, are produced without the insertion of additional material. Of course, additional material may be added to the diaper blank to effect even greater bulk or absorbency if such is desired.

There is also a comfort factor provided by stretch in the area of the crotch since it enables that area of the diaper to develop a contour to conform to the crotch area of the individual. Additionally, because of the high twist yarns substantially throughout at least one set of yarn in the blank, the diaper as a whole has a degree of elasticity and recoverability in at least one direction which is very beneficial as can readily be understood.

After development of the shrinking characteristics in the activating zone or zones of the diaper blanks of the instant invention, the bulk in those zones is increased greater than 150% over what it was prior to shrinkage or development of the activating zone. This is, of course, established without the addition of fabric, paper or any other foreign absorbent media. With the development of the shrinking characteristics of the activating zone(s) the absorbency is increased about 600% over the absorbency it exhibited prior to activation. This is also accomplished without the addition of fabric, paper or any other foreign absorbent media. The increases in bulk and absorbency of the activated or shaped diaper of this invention is determined after five wash and dry cycles in comparison with unwashed samples.

Specifically, the term "shaped diaper" as used herein is meant to define a folded or unfolded diaper having zones of shrink differential such that a marked difference in the width or length of the diaper in the zone of highest shrinkage does occur after activation or washing to provide a definite programed or predetermined parameter to the diaper. Thus, the shaped diaper which was originally of rectangular configuration will, after washing, exhibit a predetermined and predesigned shape such as for example an hourglass-type shape or a trapezoidal shape.

With this definition for "shaped diaper," the invention in its most detailed explanation, is best defined and illustrated by a mathematical expression; however, a brief review of prior work accomplished by persons skilled in the art is first necessary in order to provide background. F. T. Peirce developed a general relationship which defined the maximum weaveability of a plain weave fabric with yarns having the inverse yarn numbering system and recorded his discovery, "The Geometry of Cloth Structures," Journal of Textile Institute (1937); to wit:

$$\sqrt{1-\left(\frac{P_1}{D}\right)^2}+\sqrt{1-\left(\frac{P_2}{D}\right)^2}=1$$

where $P_1$ is the distance between adjacent warp yarn centers, $P_2$ is the distance between adjacent filling yarn centers, and D is the sum of the end and pick diameters.

Now, when D is as defined in Equation 3 which follows and when $P_2$ is equal to or greater than D, then $$\sqrt{1-\left(\frac{P_2}{D}\right)^2}$$

becomes zero or a negative (imaginary) value. Thus, when such is the case the filling yarn in the fabric has no influence in the shrinkability of the fabric. Thus, for purposes of this invention, the maximum weaveability (defined as the construction of a fabric in which the warp and fill yarns are as close together as they can be, in the plane of the fabric) of an acceptable diaper becomes a function of the warp thread count, warp yarn size and the weave design.

The work of F. T. Peirce was extended to include weave design other than a plain weave by L. Love as reported in "Graphical Relationships in Cloth Geometry for Plain, Twill and Satin Weaves," Textile Series Report 90, September 1955. He found that the weave design has a definite effect on the average diameter of a yarn within one repeat of the weave. Thus, the weave design effects the maximum weaveability of a fabric.

Pierce and Love used the cover factor expression $$K=\frac{T}{\sqrt{N}} \quad (1)$$

where K is the cover factor, T is the threads per inch, N is the yarn number in the inverse yarn numbering system, to show that the maximum warp cover factor K will occur when the filling crimp is reduced to zero and the warp yarns lie side by side and are in contact throughout the weave repeat.

Peirce has shown that the diameter of a cotton yarn in a plain weave at maximum weaveability is $$d=\frac{1}{28}\sqrt{N} \quad (2)$$

where $d$ is the diameter of a cotton yarn in a plain weave at maximum weaveability and N is as defined above.

When Love extended Peirce's theories to weaves other than plain weaves, he defined an average compressed diameter for the yarns within one repeat of the weave and defined the average compressed yarn diameter as the sum of the individual compressed diameters divided by the total number of yarns in one repeat of the weave, i.e., $$d_{ca}=\frac{\sum_{i=1}^{x}d_{ci}}{X} \quad (3)$$

where $d_{ca}$ is the average compressed diameter, $d_{ci}$ is the individual compressed diameters, and X is the number of threads per repeat of the weave.

The solution to Equation 3 for any one particular weave design gives a linear relationship between $d$ from Equation 2 and $d_{ca}$ from Equation 3, i.e., $$A=\frac{d_{ca}}{d} \quad (4)$$

where A is an exact constant and has a definite value for each weave design.

If T in Equation 1 is considered as the reciprocal of the spaces between yarn centers P, in a particular weave design, then at maximum weaveability $$P=d_{ca}=\frac{1}{T} \quad (5)$$

By substituting Equations 2, 4 and 5 into Equation 1, the following is obtained $$K_{max.}=\frac{28}{A} \quad (6)$$

where $K_{max.}$ is the maximum average warp cover factor or maximum weaveability of a cotton fabric in which the warp yarns lie side by side in a plain weave design.

Now, assuming that a particular fabric has a low number of picks per inch, i.e., where $P_2$ is less than D, where D is the sum of the warp and filling diameters as calculated from Equation 3 above, such that if the filling threads begin to shrink without limit, the warp yarns will become jammed to the point of maximum warp cover, an expression using Equations 1 and 5 can be defined which relates the actual cover factor and the maximum warp cover factor to the potential filling shrinkage.

$$Z=\frac{K_{max.}-K_{act.}}{K_{max.}} \quad (7)$$

where $K_{max.}$ is as defined above and $K_{act.}$ is equal to K in Equation 1.

Thus, Z is a parameter that defines the potential shrinkage of the filling yarn in a fabric which can theoretically attain maximum warp cover.

The actual filling shrinkage of a fabric can be calculated as follows:

$$S=\frac{W_1-W_2}{W_1} \quad (8)$$

where $W_1$ is the original width of the fabric, $W_2$ is the width after shrinkage, and S is the actual shrinkage or the fractional shrinkage value.

Having examined the relationship between the Z and S values of a great number of gauze diaper fabrics (where gauze diaper fabric is defined as not including bird's-eye diaper fabric) with various $K_{max.}$ and $K_{act.}$ values, a definite relationship was found between actual filling shrinkage and the potential filling shrinkage. This relationship is defined by the expression $$S=0.0003+0.0015Z+0.6875Z^2 \quad (9)$$

From a detailed study of various gauze diaper fabrics having differing Z values, it is determined that Z is limited by physical conditions of the cloth such that Z can be equal to or greater than about 0.4 but less than or equal to about 0.85. This is because below a Z value of about 0.4 the fabric has too tight a construction and absorbency is greatly reduced and vartually eliminated insofar as what is necessary in a diaper. Also, the fabric becomes too harsh and is thus an irritant which is most undesirable since it is meant to be applied directly on the baby.

If the Z value is above 0.85, the fabric is much too loose and it has no pinning strength to speak of. It is also too harsh because of the spacing between yarns and it is not absorbent enough for diaper use because of the openness.

A diaper which is to be shaped according to this invention must have two or more zones of different shrinkage, i.e., having different values of $K_{act.}$. That is, such a diaper may have two or more zones but at least one zone must differ from the rest in its $K_{act.}$ value; however, the difference must be such that the resultant diaper when activated or washed, exhibits a functional shape having the contour desired to effect the intended form-fitting characteristics and the physical comforts attached thereto as well as increased bulk and absorbency of the diaper of this invention. The difference is defined in terms of the difference in shrinkage between the shrinkages of the activating and nonactivating zones. In the first instance the activating zone will shrink to at least 17% difference, or greater shrinkage, than the shrinkage in the rest of the diaper or the nonactivating zone. This establishes a minimum based upon the functionality of the shape developed since below this the shape will not effect a functionally approved diaper in accordance with this invention. The maximum shrinkage will be no more than a 40% difference in shrinkage between the high and low activating zone, or in other words, the activating zone or zones will shrink no more than about 40% more than the nonactivating zone. Thus, if we consider a diaper having two zones, L and H, where zone L is the relatively nonshrinking zone, and zone H is the activating zone, the following mathematical limits are established as to the minimum and maximum shrinkage or the shape limits for each zone (see FIG. 19).

$$(1-S_L)x \leq \alpha \qquad (10)$$

$$(1-S_H)x \geq \beta \qquad (11)$$

and $$0.83(1-S_L)x \geq (-S_H)x \geq 0.60(1-S_L)x \qquad (12)$$

where $S_L$ is the shrinkage of zone L, $S_H$ is the shrinkage of zone H, $x$ is the width of the unactivated diaper, $\alpha$ is a constant which is the preferred widest acceptable width of one zone of the diaper, and $\beta$ is a constant defining the narrowest acceptable width of any one zone in the diaper.

Considering the acceptable physical property limits given in Equations 11, 12 and 13 and the relationship given in Equation 9, a graph is erected as shown in FIG. 19 where $Z_L$ and $Z_H$ define the low and high filling shrinkage values for the non activating and activating zones of a diaper. It has been established that in the diapers constructed in accordance with this invention the value Z is limited by physical properties such that it may be equal to or greater than 0.4 but must be no greater than about 0.85; therefore, both $Z_H$ and $Z_L$ have these limitations as are limited by the appropriate physical properties represented in FIG. 19 by the dotted lines designated PP Limit (LL) and (UL) for lower and upper limits, for both $Z_H$ and $Z_L$. The lines marked USL and LSL define the upper and lower shape limits respectively, as calculated utilizing Equation 12; as for example $$USL = 0.60(0.0003 + 0.0015Z_L + 0.6875Z_L^2)$$
$$+0.40 = 0.0003 + 0.0015Z_H + 0.6875Z_H^2$$

and $$LSL = 0.83(0.0003 + 0.0015Z_L + 0.6875Z_L^2)$$
$$+0.17 = 0.0003 + 0.0015Z_H + 0.6875Z_H^2$$

Constructing the lines USL and LSL on the graph in FIG. 19 puts boundaries on the area which is cross hatched. These limits are the lines USL and LSL for the upper and lower shape limits on the line representing the physical property lower limit for $Z_L$ along with the ing the physical property lower limit for $Z_L$ along with the line representing the physical property upper limit for $Z_H$. Thus, the shaped diaper of this invention is defined as having one or more zones of low or normal shrinkage, i.e., the $Z_L$, and one or more zones of high unidirectional shrinkage, i.e., the $Z_H$, within the cross hatched area of FIG. 19.

If an arbitrary $Z_L$ is chosen for the lowest activating zone of a diaper between the physical property limits given before, i.e., $0.4 \leq Z \leq 0.85$, then $Z_H$ can be chosen within the boundaries of the shape limits defined by Equation 12. The same can be accomplished with respect to an arbitrarily chosen $Z_H$. For example, as a result of the relationship between shape and physical properties, it is established that if an arbitrary $Z_L$ is chosen greater than 0.77, a $Z_H$ must be chosen greater than 0.85 in order to satisfy the shape limits. This falls outside of the upper limit and is without the definition or limitations of the instant invention.

Stated another way and with reference to the graph of FIG. 19, $0.4 \leq Z_L \leq 0.76$ or $Z_L$ is equal to or greater than 0.4 and less than or equal to about 0.76. Thus, $Z_H$ can be stated as being equal to or less than 0.85 and greater than or equal to about 0.62.

If the limits defined by the graph of FIG. 19 are observed when designing a diaper, the resultant activated diaper will fall within the confines of this invention.

Other features and advantages of the invention will be apparent from the following description taken together with the accompanying drawings wherein:

FIGURE 1 is a schematic plan view of a portion of a strip of woven diaper fabric.

FIGS. 2a through 2c are schematic plan views of diaper blanks which represent embodiments of the instant invention which can be taken from the woven diaper material, i.e., diaper blank A of FIG. 1, dependent on the particular construction of the diaper fabric.

FIG. 3 is a plan view illustrating the diaper blank A of FIG. 1 folded and sewn to form a woven rectangular diaper.

FIG. 4 is a sectional view along line 4—4 of FIG. 3.

FIG. 5 is a plan view of the folded diaper of FIG. 3 after it has been washed and differentially shrunk to produce a form-fitting diaper in accordance with the invention.

FIG. 6 is a sectional view along line 6—6 of FIG. 5.

FIG. 7 is a plan view of a diaper blank incorporating a different embodiment of the present invention and in which the shrink zone is located in a different position.

FIG. 8 is another schematic plan view of a portion of a strip of woven diaper fabric.

FIGS. 9a and 9b are schematic plan views of diaper blanks which, dependent on the construction of the diaper fabric, could be cut from the fabric of FIG. 8.

FIG. 10 is a plan view illustrating the diaper blank of FIG. 9a, folded and sewn to form a woven rectangular diaper.

FIG. 11 is a sectional view along line 11—11 of FIG. 10.

FIGS. 18a through 18d are plan views of embodiments of the instant invention before and after activation, and FIG. 19 is a graph defining the instant invention in mathematical terms.

Figure 12A:
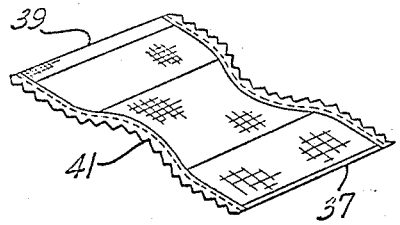
FIGS. 12a and 12b are plan views of the folded diaper of FIGS. 9a and 9b after each has been washed and differentially shrunk to produce a form-fitting diaper in accordance with the invention.

Referring to FIG. 1 of the drawings there is shown a fabric 20 woven in a continuous sheet approximately forty (40) inches wide. The fabric is a two-ply gauze diaper cloth with a selvage 21 at each lateral edge and with transverse pinking bars 22 evenly spaced along the length of the fabric approximately twenty (20) inches apart. Pinking bars 22 are strips of fabric woven as a single-ply to produce a tighter weave and minimize unraveling when the fabric is cut along the bars to form diaper blanks (FIGS. 2a–2c). The warp yarns run the length of the fabric while the fill yarns run its width or parallel to pinking bars. In this instance all of the fill yarn of the fabric has a high twist multiplier of between 5 and 8, and all of the warp yarns have a twist multiplier of 4.0.

Intermediate and parallel to the selvage edges are a pair of spaced wearing strips 24 woven integral with the two-ply diaper cloth. The wearing strips are depicted as single-ply but may be multi-ply, however, they are located so as to present convenient lines of fold for a prefolded diaper (FIG. 3). In a diaper thus prefolded, the wearing strips are located along the folded edges and will, because of their tighter weave, possess greater abrasion resistance during use.

A zone 28 of more open construction than the remainder 27 of the intended diaper blank (represented by A) is provided with a loose weave since otherwise there would not be sufficient space between adjacent yarns to allow the development of sufficient shrinkage because of the same ply construction yarn size in fill and warp throughout the blanks A. As to the forming of the prefolded diaper and with reference to FIG. 2a, the two opposing lateral edges each having selvage edge 21 are folded along the nearest wearing strip 24 and over the surface of diaper blank 23 in parallel relation, to form opposed marginal panels of unequal length with a separating section of the sheet between the marginal panels, the sheet may then be folded to superimpose the marginal panels and the lateral edges of the sheet whereby a three-layered panel section is formed and secured in position. Additional folding techniques are disclosed and claimed in U.S. 2,845,069 and U.S. 2,600,634. For example, the lateral edges of the blank need only be folded over the blank to superimpose one of the lateral edges a distance over and beyond the other to provide a three-layered center absorbent section. Also, one lateral edge may be extended past the other, in the folding operation, a distance sufficient to allow the former to be folded back over or under its own length to provide a four-layered center section or panel.

In the embodiment of the invention illustrated in FIGS. 2a, 3 to 6, the diaper blank 23 is rectangular and presents opposed pinked edges 29 along its larger dimension. Diaper blank 23 corresponds to that designated A in FIG. 1. Its warp yarns 25 have substantially the same number of turns per inch through the whole of the diaper. The filling yarns 26 of the diaper blank run parallel to the length of the blank. With particular reference to the diaper blank 23 of FIG. 2a, it is to be noted that the zone 28 is shown of a different and more open or looser weave than the remainder of the diaper 23 defined by zones 27. In reality, as has been mentioned, each ply of zone 28 is defined by a loose weave; however, each zone of zone 28 is also defined by a pick difference of at least one-half the picks of each of the layers or plies in zones 27. FIG. 2b is similar to the blank of FIG. 2a except that the zone 28, i.e., the activating zone, is shown, in cutaway, to have a three-ply construction whereas the intermediate zones 28a have two-ply construction and the remainder of the diaper blank 23b, as represented by zones 27, is of single-layer construction. The weave of zone 28 is again the loose weave while zones 28a have one less ply than zone 28 and one more than zones 27. The diaper blank of FIG. 2c, or blank 23c, is again similar to blank 23 except that another pair of intermediate zones, i.e., zones 28b, have been interposed adjacent to zones 27 and zone 28a. Zone 28 is shown to be of four-ply construction, with zones 28a, 28b and 27 being shown of three, two and one-ply construction respectively. Zone 28 again has the loose weave.

With reference to FIG. 3, the diaper blank 23 of FIG. 2a is folded along each of the wearing strips 24 and inwardly from the selvage edges 21. The position of the folds inwardly from the selvage edges is such that the marginal portions of the blank adjacent the selvages overlap and the wearing strips 24 become the folded edges of the diaper. The folded diaper consists of three panels 30, 31 and 32 of approximately equal width and with the center panel 31 comprising three thicknesses of gauze diaper cloth and the lateral panels 30 and 32 two thicknesses each. The panels of the folded diaper are held in their relative positions by sewing 33 along the selvage edges.

The prefolded diaper just described will, upon washing and drying, shrink to a greater degree in zone 28 containing the open construction. Specifically, in the diaper of FIG. 3 in which the activating zone is a center zone 28, shrinkage occurs in that zone to give a form-fitting or hourglass shape (FIG. 5).

FIGS. 4 and 6 represent cross sections taken along line 4—4 of FIG. 3 and 6—6 of FIG. 5 respectively. Each shows the result of the prefolding.

By locating the activating zone slightly off-center in the diaper blank, e.g., the diaper blank of FIG. 2a, a diaper with the form-fitting section correspondingly located may be obtained upon folding and subsequent washing (FIG. 7).

FIG. 8 represents still another construction of diaper fabric 36 from which diaper blanks of this invention could be taken. Depending on the specific construction of the diaper fabric 36, diaper blanks 40a and 40b of FIGS. 9a and 9b could be taken from that fabric. Diaper fabric 36 may be of single or multi-ply construction and has selvage edges 37 running the length of the fabric which is, once again, of a continuous sheet form approximately 40 inches wide. In this instance all of the warp yarn in the fabric 36 is provided with a high twist multiplier of from about 5 to about 8 while the fill yarn has a standard twist multiplier.

Parallel to the selvages and midway between them is a wearing strip 39 woven integral with the two-ply diaper fabric. Also, transverse pinking bars 38 are evenly spaced at intervals along the length of the fabric and extend from one selvage edge to the other to define the longitudinal edges of the diaper blanks which will be cut from the fabric 36.

Diaper blanks 40a and 40b of FIGS. 9a and 9b represent blanks which could have been taken from diaper fabric 36 by cutting along the pinking bars 38 of the fabric to give the longitudinal pinked edges 41 of each of the blanks. Blank 40a of FIG. 9a is divided into two panels by wearing strip 39 and each of these panels is shown to have an intermediate zone 45 which is of three-ply construction. Since there is a two-ply difference in favor of the activating zone 45 in this instance, a loose weave is not needed. The remainder of the diaper is represented by zones 44 and is of single-ply construction.

In FIG. 9b, the activating zone 45 is constructed of an open construction. Zones 45 are located at the extremities of the diaper blank. Additionally, a pair of intermediate zones 45a is interposed between the activating zone 45 and the rest of the diaper represented by zones 44. As is shown, zones 44 are of single-ply construction, zones 45a are two-ply and zones 45 are of three-ply construction. In actuality and in accordance with this invention, zones 45a and 45 could, as well, both be of a loose weave. Another pair of intermediate zones could be woven in juxtaposed relationship to zones 45a and 44 following a construction similar to that shown and described with reference to FIG. 2c.

Both diaper blank 40a and 40b are designed to be folded along wearing strip 39 to superimpose each of the two like panels of the blank whereby the activating zones 45 of each are superimposed one over the other as are the other zones of each panel. FIG. 11 shows in cross section the folded blanks of either FIG. 9a or 9b which have been stitched 46 along the pinking bars 41 to secure them in position.

Figure 12B:
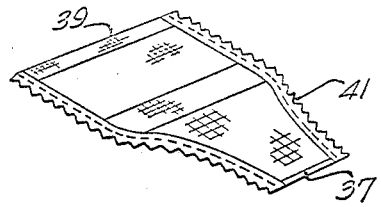

FIGS. 12a and 12b depict the folded and shrunk products of the diaper blanks of FIGS. 9a and 9b respectively. Because of the central location of the activating zone 45 in each of the panels of the blank of FIG. 9a and the superimposing of these panels and activation or shrinking in zones 45 results in a diaper of hourglass configuration as shown in FIG. 12a. Because of the location of the activating zones 45 at the extremities of each panel of blank 40b of FIG. 9b, activation or shrinkage effects the trapezoid-shaped diaper of FIG. 12b. Both are form-fitting.

FIGS. 13–16 represent other embodiments of the instant invention.

Figure 13:
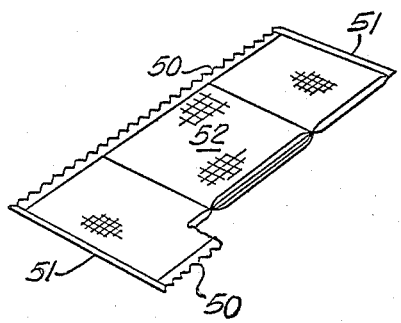
FIGS. 13 through 17 are schematic plan views of other specific embodiments of the diaper blank of the instant invention.
Figure 14:
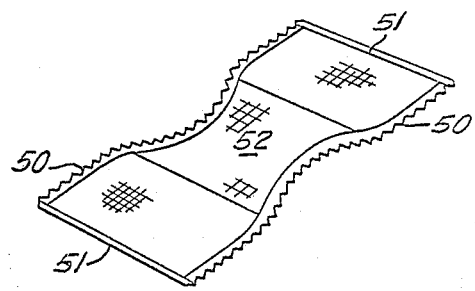

FIG. 13 depicts a diaper blank wherein the central portion 52 is the activating zone and is constructed of four plies. The remainder of the diaper is of two-ply construction and has a standard weave. Selvage edges 51 define the direction of the length of the original diaper fabric; therefore, the warp yarn parallels the width of the diaper blank while the fill parallels the length. The warp yarn is the high twist yarn. Pinking bars 50 define the longitudinal edges of the blank. After laundering and drying of the diaper blank of FIG. 13 the product is depicted in FIG. 14. The activating zone has shrunk to provide an unfolded, hourglass-shape diaper.

Figure 15:
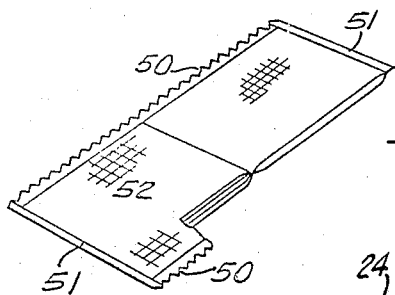
Figure 16:
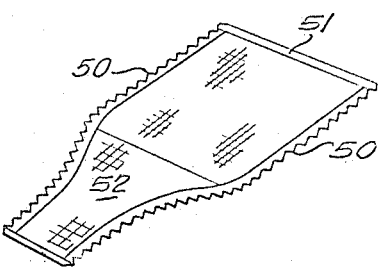

In FIG. 15, zone 52 represents the activating zone having a four-ply construction. The remainder of the diaper has the two-ply construction. The warp yarns run the width of the blank and have the high twist. On washing and drying the diaper of FIG. 16 results since the activating zone 52 is located at an extremity of the blank. Thus a trapezoid-shaped unfolded diaper results. It is possible to provide intermediate zones interposed between the activating zone 52 and the remainder of the diaper, as was disclosed with reference to FIGS. 2b and 2c. In that event more gradual contrast from the shrinking to the nonshrinking zone is effected in the activated diaper.

Figure 17:
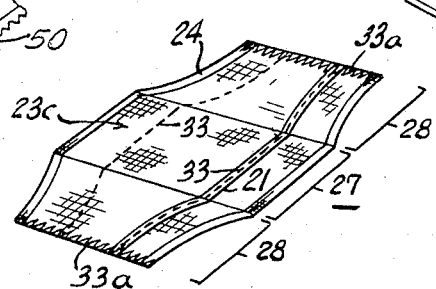

FIG. 17 depicts yet another diaper embodiment of this invention wherein the activating zones 28 are positioned at the extremities of the prefolded diaper 23c and are shown as having the open construction. In this instance the wearing strip 24 is once again complete with reinforced yarns and may be single or multi-ply. One of the selvage edges 33 of the diaper 23a is folded within and is shown by dotted line, while the other 33 is exposed and stitched 21 in position. Overedging 33a closes the two lateral edges of the diaper 23c which may be of single or multi-ply construction or of a combination of these.

In FIGS. 18 and through 18d, 18a represents a rectangular diaper fabric constructed in accordance with this invention and having zones L of low or normal shrink along with zone H, i.e., the activating zone, which has high shrinkage constructed into it. X represents the width of the diaper fabric prior to activation or shrinkage and, for purposes of Equations 10, 11 and 12 is taken to define the width of the unactivated diaper. FIG. 18b depicts the diaper of FIG. 18a after activation or shrinkage into a predetermined, programed hourglass-like parameter. The distance $\alpha$ is a constant and defines the largest width deemed practical for diaper construction, and the distance $\beta$ is also a constant and defines the smallest practical width for the contoured zone of a shaped diaper. The numerical value for $\beta$ is four inches and the numerical value for $\alpha$ is twenty-five inches. A width of four inches does provide adequate absorbency and adequate fabric in the narrowest zone or in the activated zone of an infant diaper, while a width of greater than twenty-five inches in the nonactivating zone of an adult diaper is impractical in that it presents a burden. As used in the preceding sentence, the word "diaper" refers to the "diaper" in the folded or unfolded state which is in that physical state ready for the user, without having to undergo any additional folding or rearrangement prior to being fitted or placed in position on the user.

FIGS. 18c and 18d simply relate that the zones L and H can be located in different positions without any difficulty insofar as the definition of the instant invention is concerned and that the values for $\alpha$ and $\beta$ do, indeed, remain constant.

FIG. 19 is a graph constructed utilizing $Z_H$ values as the ordinate and $Z_L$ values as the abscissa. The cross hatched area defines this invention in terms of its upper and lower shape limits USL and LSL respectively, and in terms of the upper physical property limits for $Z_H$ and the lower physical property limits for $Z_L$ as has been earlier discussed in detail.

Having described certain embodiments of this invention, it will be further illustrated by the following non-limiting specific examples.

*Example 1*

Diaper cloth is woven 37 inches wide. The warp ends are randomized S and Z twist, 25's with 86 ends to the inch. The filling picks are all Z twist, 30's weight yarns. The first 6½ inches of the fabric are woven as a tube in a plain weave using 80 filling yarns to the inch so that this area of the fabric contains two layers, each having a thread count of 43×40. The next 8 inches of the fabric are woven as a tube in a 2 x 2 filling rib weave using using 62 filling yarns to the inch so that this area contains two layers, each having a thread count of 43×31. The first 6½ inches as previously described is then repeated to produce a diaper blank.

The warp yarns have a twist multiplier of 4.20 and the filling yarns have a twist multiplier of 6.0.

The diaper is formed by folding the above-described blank as described and illustrated in conjunction with FIG. 5. The folded blank is sewn adjacent the selvage edges to prevent unfolding and is overedged at the cut ends to prevent raveling.

Upon washing and drying, the diaper shrinks about 21% more in the center 8 inches of the diaper than it does in the remaining portions. The diaper will have an hourglass shape and be form-fitting as shown in FIG. 5.

*Example 2*

Diaper cloth 37 inches wide is woven wherein the warp ends are randomized S and Z twist, 25's with 86 ends to the inch. The filling picks are all Z twist, 30's weight. The first 6½ inches of the fabric are woven as a double cloth using 62 filling yarns to the inch so that this area of the fabric is of one-layer construction. The next 8 inches of the cloth or fabric is of tubular construction in a filling face broken twill weave using 62 picks to the inch, with each of the plies or layers having 43 ends and 31 picks to the inch. The remaining 6½ inches of the diaper blank is constructed and woven as is the first 6½ inches described above.

The twist multiplier of all of the filling yarns in the blank is 6 while the twist multiplier of all of the warp ends is 4.20. (A diaper similarly constructed is illustrated in FIG. 3.) The folded blank is sewn adjacent the selvage edges to prevent unfolding and is overedged at the ends following the teaching of U.S. 3,123,035 to prevent raveling.

With development of the shrinking characteristics in the fill direction of the activating zone, which is defined by the interior 8 inch zone having the tubular construction with the filling face broken twill weave, by washing and drying, it is found that there is 35% more shrinkage in this aforementioned activating zone than in the remainder of the diaper to provide an hourglass form-fitting shape similar to that depicted in FIG. 5. The bulk and absorbency of this zone is also increased by at least 150% and at least 600% respectively, over that originally possessed.

*Example 3*

A diaper blank 37 inches wide is provided wherein the warp ends run in the widthwise direction of the unfolded blank and are randomized S and Z twist, 25's with 86 ends to the inch. The filling picks are all Z twist, 30's weight yarns. From one longitudinal edge of this blank to the other there is provided, for the first 5½ inches, a double cloth weave and, therefore, a single-layer construction.

The next 5½ inches has a tubular construction with a plain weave, while the remaining 10 inches has a tubular construction with a broken twill weave. The respective yarn counts are 86×62, 43×31 and 43×31. The filling yarn is 100% high twist, having a twist multiplier of 6.0 while the warp yarns have a standard twist multiplier of 4.2. After washing and drying the activating zone, i.e., the 10 inch zone having the tubular construction with a broken twill weave, is found to have shrunk (in the fill direction) about 30% more than the double cloth zone, and the intermediate zone, i.e., the zone of plain weave and tubular construction is found to have shrunk 15% (in the fill direction) more than that of the zone having the double cloth construction. The contour developed is similar to that of FIG. 12b, or a trapezoid-shaped form-fitting shape.

*Example 4*

A rectangular diaper blank is constructed having selvage ends at both of its widthwise extremities and fill yarns running in this widthwise direction. The warp ends have a twist multiplier of 7 and are 25's while the filling picks have a twist multiplier of 3.75 and are 35's. The blank is 40 inches long and 20 inches wide and its lengthwise direction is bisected by a 1 inch single-layer wearing strip extending from one longitudinal edge of the diaper to the other. The yarn count is 120×96. Extending equally on either side of this wearing strip are three zones, the first of which extends 5 inches on either side of the strip and has a single ply construction of a plain weave where each ply has a yarn count of 120×96. The next 5 inches in either direction is the intermediate zone and is given a two ply construction with a plain weave. Each ply has a yarn count of 60×48. The last 10 inches of the blank, which extends from each intermediate zone to a selvage, where each ply has a 40×32 yarn count is known as the activating zone(s) and has a three ply construction with a plain weave. A 1 inch single-layer pinking bar having a thread count of 120×96 extends along each longitudinal edge of the blank.

This diaper blank is folded along the wearing strip to superimpose each of the zones of the blank extending from the wearing strip to one selvage, with the zones extending in opposite directions from the wearing strip (see FIGS. 9b and 11). The shrink characteristics of the blank are developed and it is found that the activating zone shrinks 45% and the intermediate zone shrinks 15% more (in the warp direction) than the diaper cloth defined by the tubular cloth and the plain weave. Shrinkage in the former two zones takes place predominantly in the fill direction and a trapezoidal contour is developed (see FIG. 12b). The bulk of the activating zone is found to have increased at least 150% while the absorbency per unit area of that zone has increased by more than 600%.

*Example 5*

Following the procedure of Example 4, a rectangular diaper blank is provided; however, the wearing strip and the pinking bar have a thread count of 86×62, the high twist yarn extends in the filling direction and the three zones each extend in parallel relationship from one pinking bar to the other and extend from wearing strip to selvage on each side of the wearing strip. The first zone extends uniformly from one pinking bar a distance of 6 inches toward the opposite pinking bar and is of double cloth weave, single-layer construction having a thread count of 86×62. The next 8 inches is defined as the activating zone and is of tubular construction with each ply having a broken twill weave and a thread count of 43×31. The remaining 6 inches of the blank is of the same weave and ply construction as the first 6 inches described above.

The diaper is folded along the central wearing strip to superimpose the panels extending on either side of the wearing strip, and sewn in position. The diaper is washed in water and dried whereupon the superimposed activating zones are found to each shrink 40% greater than the remainder of the diaper in the warp direction to provide an hourglass shape. The bulk and absorbency per unit area of the activating zone were found to have increased to greater than 150% and 600% respectively.

*Example 6*

Diaper cloth is woven 37 inches wide. The warp ends are randomized S and Z twist, 25's with 86 ends to the inch. The filling picks are all Z twist, 30's weight yarns. The first 6½ inches of the fabric are woven as a tube in a plain weave using 70 filling yarns to the inch so that this area of the fabric contains two layers, each having a thread count of 43×35. The next 8 inches of the fabric are woven as a tube in a broken twill long float weave using 70 filling picks to the inch so that this area contains two layers, each having a thread count of 43×35. The first 6½ inches as previously described is then repeated to produce a diaper blank.

The wrap yarns have a twist multiplier of 4.20 and the filling yarns have a twist multiplied of 6.0.

The diaper is formed by folding the above-described blank as described and illustrated in conjunction with FIG. 5. The folded blank is sewn adjacent the selvage edges to prevent unfolding and is overedged at the cut ends to prevent raveling.

Upon washing and drying, the diaper shrinks about 21% more in the center 8 inches of the diaper than it does in the remaining portions. The diaper will have an hourglass shape and be form-fitting as shown in FIG. 5.

It is to be understood that while normal washing and drying of the diaper either by the parent or by some agency for the parent is usually the means by which the shrinking characteristics of the activating zone(s) and the intermediate zone(s), if present, are effected, it is possible that the shrinking may be developed in manufacture of the blank, e.g., during the finishing operation. This choice is one of election to be made by the manufacturer.

A diaper blank similar to that of U.S. 3,072,124 may also be constructed and an activating zone or zones may also be provided therein whereupon folding consistent with the teachings of that patent and development of the activating zone(s) will result in a form-fitting diaper consistent with this invention.

By way of example herein, the fill direction and the filling yarn have been designated the yarns which are required to possess the high twist to effect the potential energy for the unidirectional shrinkage, but this is purely for example sake, since the warp could be utilized equally as well.

The invention has been described in connection with its preferred embodiments but many modifications thereof are included without a departure from the inventive concept, which is limited only by the scope of the appended claims.

What is claimed is:

1. A woven diaper of zoned construction comprising at least one high shrink zone and at least one low shrink zone, said diaper being defined by the cross-hatched area of FIG. 19, having shape limitations defined by the upper shape limit (USL) and the lower shape limit (LSL) and having physical property limitations defined by a $Z_L$ within the range of 0.4 to 0.78 and a $Z_H$ within the range of 0.62 to 0.85, said diaper being adapted to form a pre-designed parameter upon activation.

2. The diaper of claim 1 wherein at least one intermediate zone is positioned within said diaper in juxtaposed relationship to each high shrinking zone.

3. The diaper of claim 1 wherein said high shrinking zone occupies from about 25% to about 50% of the total area of said diaper.

4. The diaper of claim 1 wherein said high shrinking zones occupy from about 65% to about 80% of the total area of said diaper.

5. A diaper constructed of interwoven warp and filling yarn sets wherein at least from about 50% to 100% of one first set of said yarn possess a high twist multiplier of from about 5 to about 8, said diaper having at least one high shrinking zone adapted to shrink to provide a contoured diaper, where said diaper is defined by the cross-hatched area of FIG. 19, has shape limitations defined by the upper shape limit (USL) and the lower shape limit (LSL) and has physical property limitations defined by a $Z_L$ within the range of 0.4 to 0.78 and a $Z_H$ within the range of 0.62 to 0.85.

6. The diaper of claim 5 wherein said zone occupies from about 25% to about 50% of the total area of said diaper.

7. The diaper of claim 5 wherein at least one intermediate zone is positioned within said diaper in juxtaposed relationship to each high shrinking zone.

8. A diaper constructed of interwoven warp and filling yarn sets wherein at least from about 50% to 100% of one first set of said yarn possess a high twist multiplier of from about 5 to about 8 and said high twist yarn is substantially uniformly dispersed throughout said diaper, said diaper having at least one high shrinking zone adapted to shrink at least about 17%, as compared to the total shrinkage, where said diaper is defined by the cross-hatched area of FIG. 19, has shape limitations defined by the upper shape limit (USL) and the lower shape limit (LSL) and has physical property limitations defined by a $Z_L$ within the range of 0.4 to 0.78 and a $Z_H$ within the range of 0.62 to 0.85.

References Cited by the Examiner

UNITED STATES PATENTS

| | | | |
|---|---|---|---|
| 1,842,623 | 1/1932 | Moore | 139—383.5 |
| 1,842,729 | 1/1932 | Moore | 139—383.5 |
| 1,941,868 | 1/1934 | Leavy | 128—284 |
| 2,588,113 | 3/1952 | Harrison | 128—284 |
| 2,649,858 | 8/1953 | Le Bolt | 128—284 |
| 2,754,824 | 7/1956 | Blaufus | 128—284 |
| 2,833,282 | 5/1958 | Moore | 128—284 |
| 2,845,069 | 7/1958 | Jamison et al. | 128—284 |
| 2,995,154 | 8/1961 | Seltzer | 139—383 |
| 3,072,124 | 1/1963 | Jamison | 128—284 |

MERVIN STEIN, *Primary Examiner.*

H. S. JAUDON, *Assistant Examiner.*

UNITED STATES PATENT OFFICE
CERTIFICATE OF CORRECTION

Patent No. 3,291,162                          December 13, 1966

Samuel James Jamison

It is hereby certified that error appears in the above numbered patent requiring correction and that the said Letters Patent should read as corrected below.

Column 8, line 4, for "vartually" read -- virtually --; line 24, for "picsk" read -- picks --; column 9, line 66, strike out "ing this physical property lower limit for $Z_L$ along with the"; before line 73, insert -- The graph of FIG. 19 is used as follows --; column 13, line 44, for "FIGS. 18 and" read -- FIGS. 18a --; column 16, line 21, for "multiplied" read -- multiplier --.

Signed and sealed this 19th day of September 1967.

(SEAL)
Attest:

ERNEST W. SWIDER
Attesting Officer

EDWARD J. BRENNER
                                       Commissioner of Patents